Sept. 30, 1969   C. D. FRISBY ET AL   3,470,367
WIDE-RANGE ANALOG-TO-DIGITAL INTEGRATOR FOR USE WITH
ANALYTICAL MEASURING INSTRUMENTS
Filed April 9, 1965   6 Sheets-Sheet 6

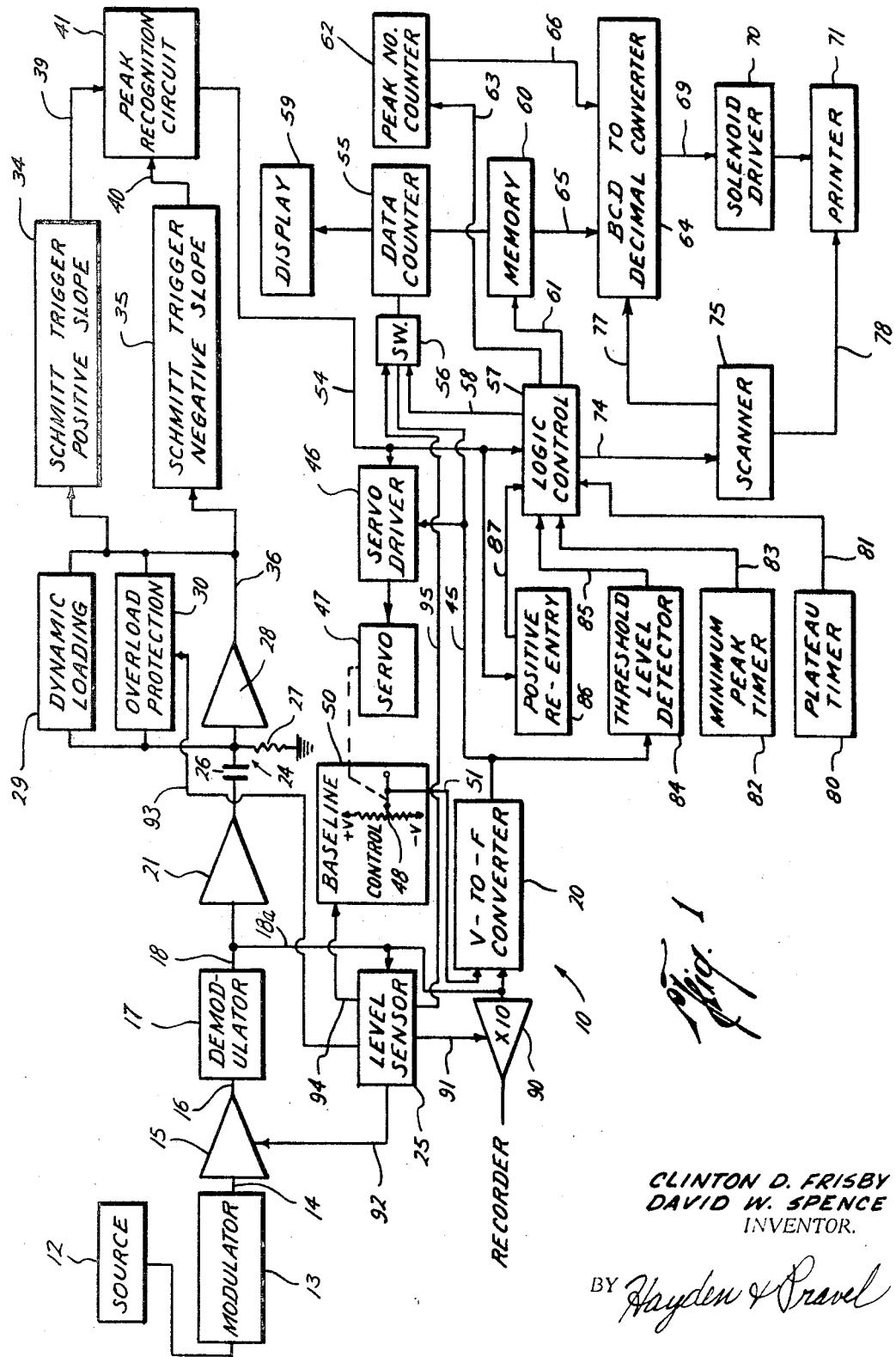

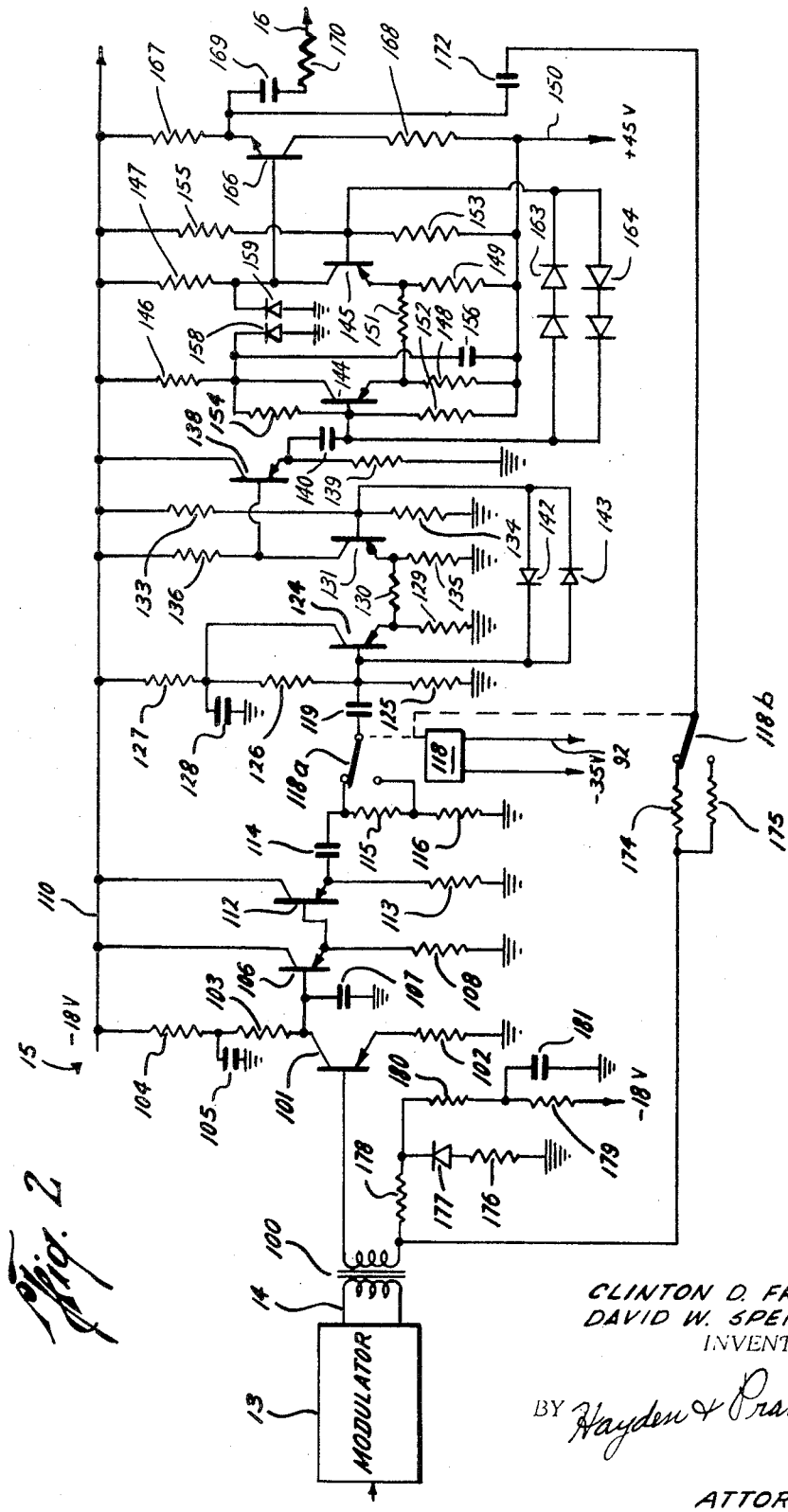

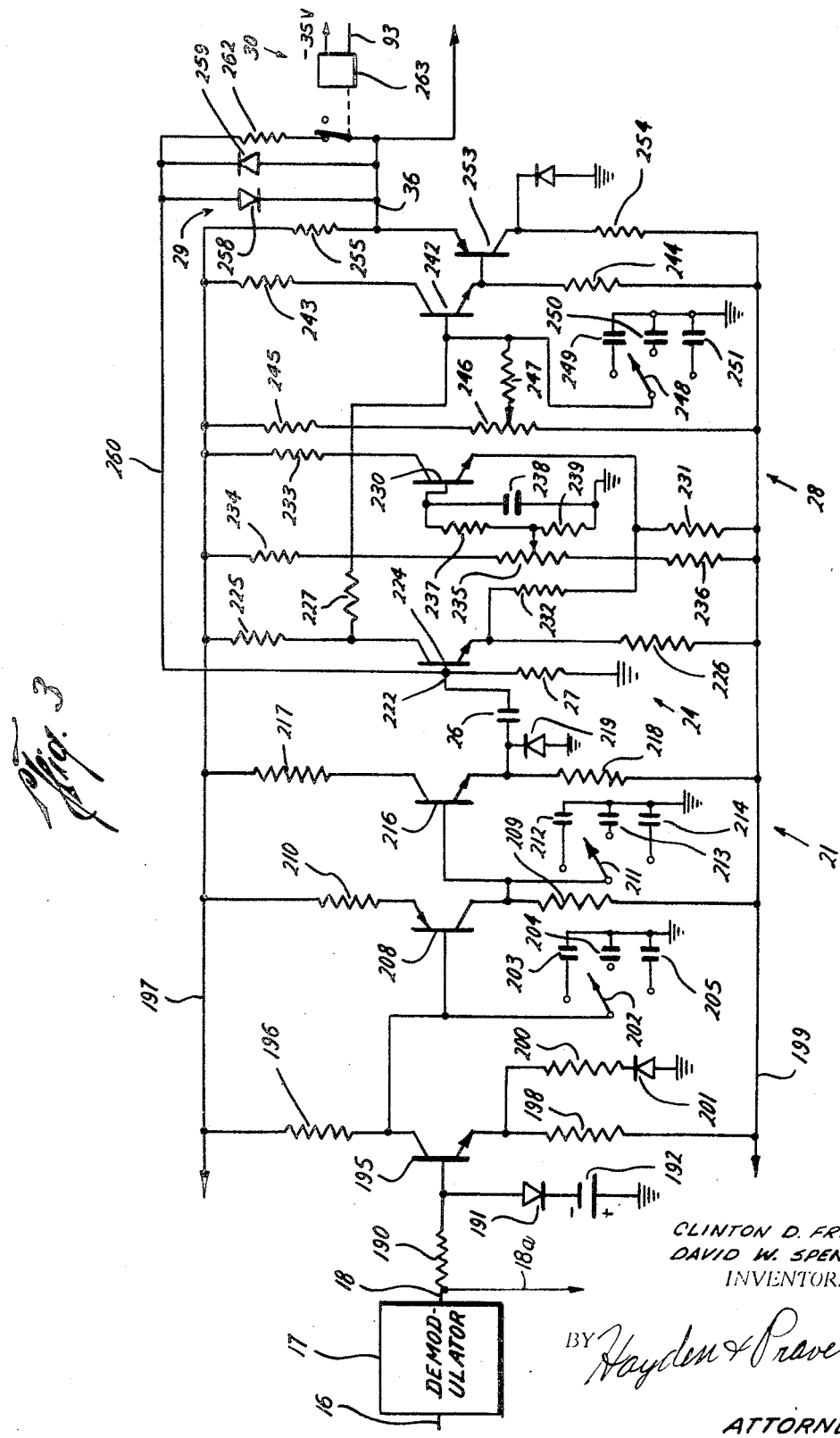

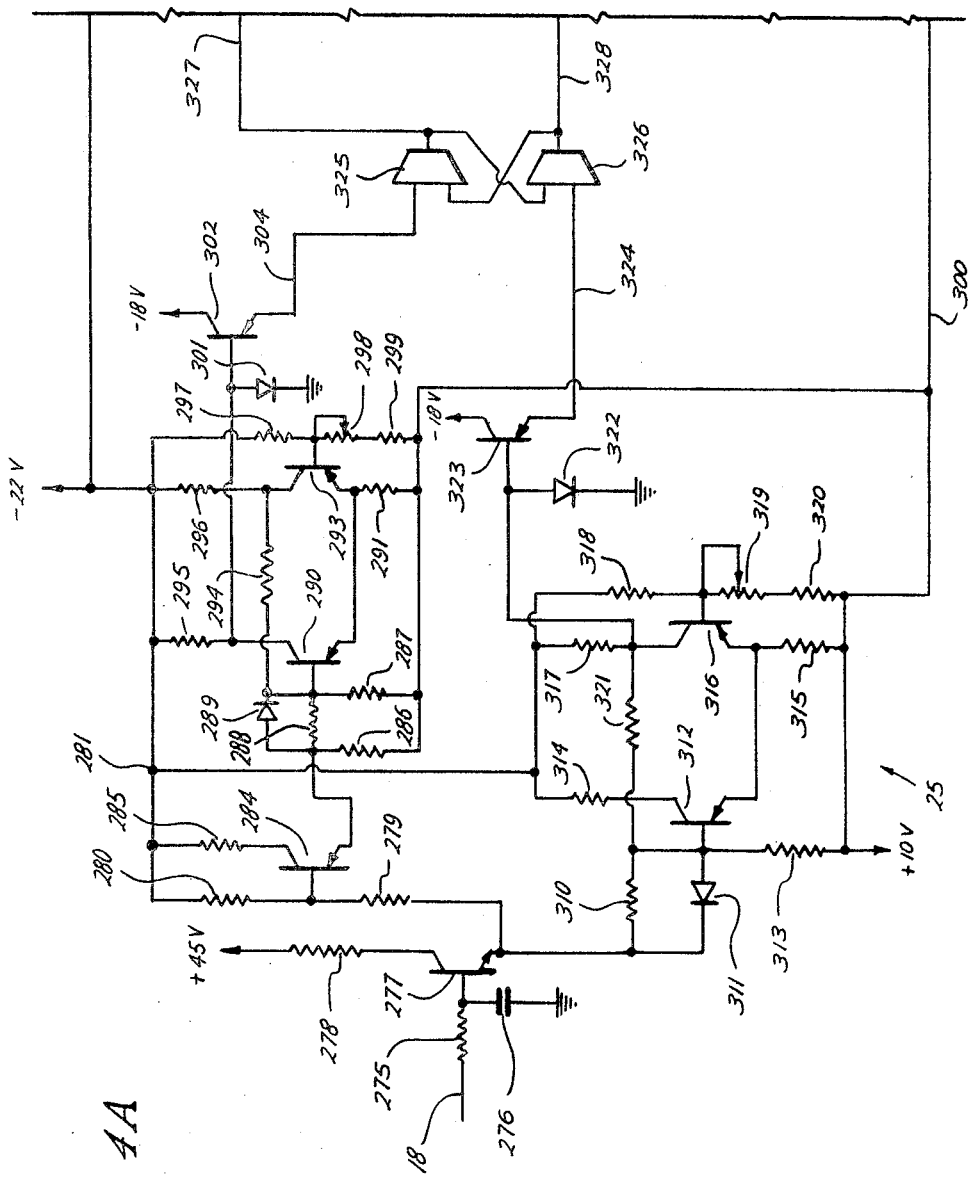

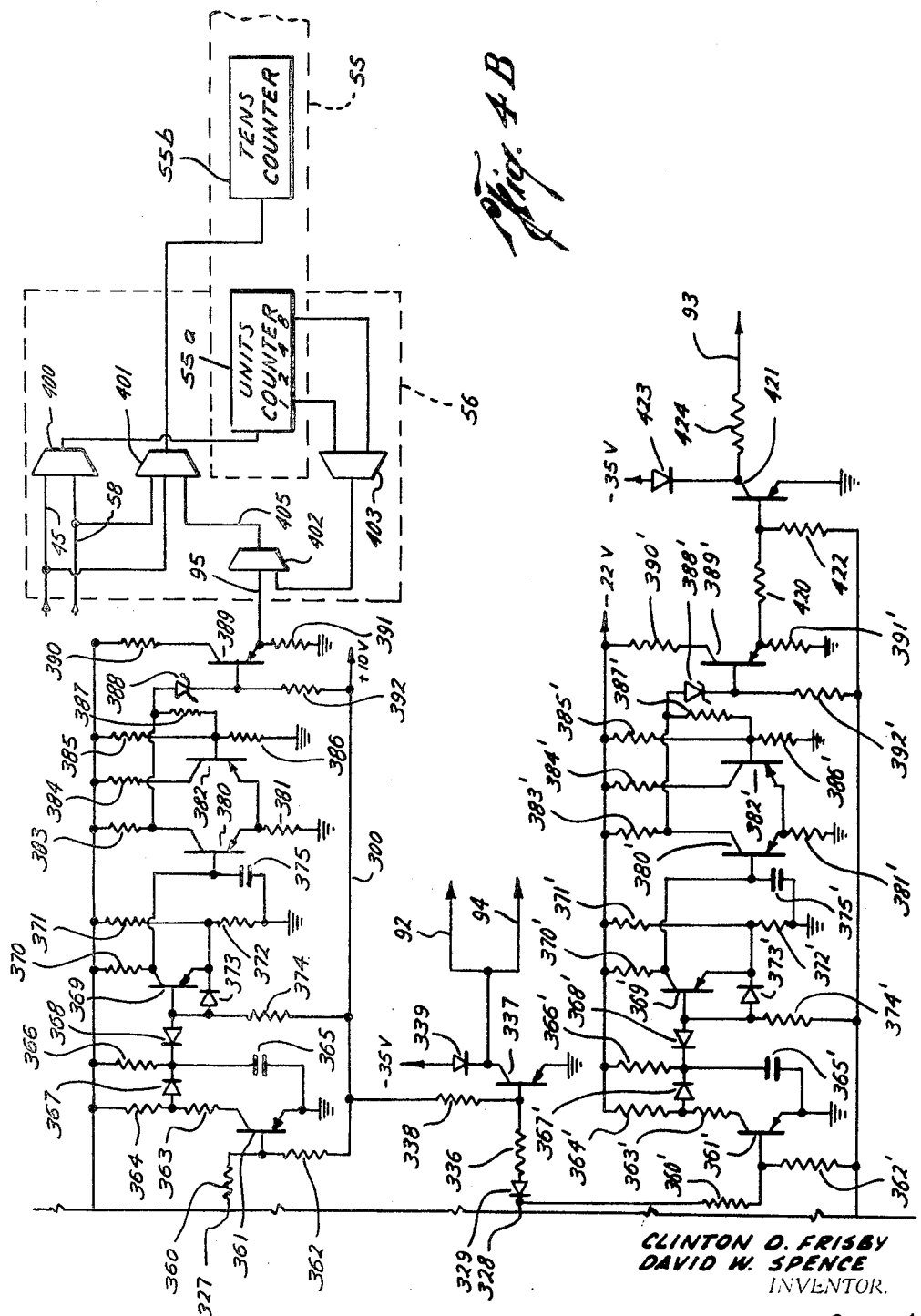

CLINTON D. FRISBY
DAVID W. SPENCE
INVENTOR.

BY Hayden & Pravel

ATTORNEYS

United States Patent Office 3,470,367
Patented Sept. 30, 1969

3,470,367
WIDE-RANGE ANALOG-TO-DIGITAL INTEGRATOR FOR USE WITH ANALYTICAL MEASURING INSTRUMENTS
Clinton D. Frisby and David W. Spence, Houston, Tex., assignors to Infotronics Corp., a corporation of Texas
Filed Apr. 9, 1965, Ser. No. 447,026
Int. Cl. G06g 7/18
U.S. Cl. 235—183                    21 Claims

ABSTRACT OF THE DISCLOSURE

A two-range signal integrator with automatic switching between ranges. Such integrator is useful with analog-type analytical measurement signals having recurrent data fluctuations which extend from a baseline value, the integrator serving to individually integrate the areas under the different data fluctuations. The integrator includes an amplifier for amplifying the analog measurement signals, an integrating-type, voltage-to-frequency converter responsive to the amplified measurement signals for producing an output pulse for each predetermined incremental area of the analog signal wave form above the baseline value, a pulse counter for counting the pulses produced during each data fluctuation in the analog signal and printing means coupled to the pulse counter for producing a readable record of the integral values for the various data fluctuations. Range switching is accomplished by a level sensor which is responsive to the amplified analog input signal and operates to change the gain of the input amplifier when the analog signal passes a predetermined signal level. At the same time the level sensor changes the pulse counter decade to which the pulses are supplied so as not to change the significance (or scale factor) of the data values printed by the printing means. A peak sensor subsystem is responsive to the incoming measurement signal to correlate the operation of the pulse counter with the occurrence of the data fluctuations in the measurement signal.

This invention relates to an integrating device for use with signals such as those supplied by analytical devices, and more particularly relates to a device which provides truly automatic and completely unattended monitoring of signals to output the integral of the area of peak fluctuation in the signals accurately and which filters out noise of all descriptions and drift in the signal.

Analytical equipment often provides its data output in the form of analog signals which usually requires reproduction and analysis before an interpretation of the data is possible. The analysis is directed towards ascertaining measurements for which the analytical equipment is used. For example, gas analyzers provide an output signal in which the various constituents in a sample are represented by peak fluctuations extending from a base line signal value. Typically, the analytical transducers providing such signals provide a very low voltage (ranging from one microvolt to many millivolts). Representative of such analytical devices are analyzers using flame ionization, electron capture or the like. But, in addition to microvolt range sources, there exist transducers capable of providing signal peaks in the range of one-half of a volt, or more as might be obtained from bridge type analyzers or the like. Suffice it to say that recording and indicating devices to which this invention relates should have a wide dynamic range extending from the microvolt level up to one-half volt which is 500,000 times greater.

Everyday use of analyzers such as described hereinabove is quite time consuming. For instance, setup and initiation of operation require some effort, but it will be appreciated that the burden of monitoring the operation of analytical devices is excessive and can require hours or even one day. For instance, amino acid analyzers sometimes require 24 hours to completely analyze a sample during which time the analyzer continuously provides output data. Devices to which this invention relates have required continuous attention in times past by an operator who observes the output signal as it is recorded by a strip chart recorder or a similar device and switches the attenuator with the proper timing to properly size signal peaks for the strip chart recorder and the recording device. But automatic and truly unattended recording and/or indicating equipment is presently unknown and not available. The operator is handicapped because he must monitor the indicating equipment which causes inefficiency in the operation of many laboratories, hospitals, universities and other similar places.

Attenuators which are used to properly size analytical signals for the recording and indicating apparatus have certain detrimental effects. For one, switching of an attenuator alters the base line value of the analytical signal. In addition, switching of an attenuator reflects transients into the equipment which can resemble analytical fluctuations and obscure pertinent and bona fide peaks. Moreover, while the operator controls the attenuator and can, to the best of his efforts, limit attenuator operations to not interfere with pertinent information in the analytical peaks, many strip chart recorders have integral, automatic attenuators which shift without regard to signal wave shape and cause untimely transients. Since strip chart recorders and other such devices are connected in parallel with integrating devices to which the present invention relates, transients are reflected through the input to be treated as analytical information.

Attenuator switching as described hereinabove may be considered as a special form of noise affecting integrating devices to which this invention relates. It is readily apparent that such devices are also subjected to other forms of noise. Noise constitutes a particular burdensome source of inaccuracies of integrating devices and this is most especially true when it is appreciated that such devices are quite often used to analyze output signals having base line values in the range of one microvolt. Obviously, the random nature of noise is used to advantage in removing the effects of noise in circuits which cooperate with repetitive signals; however, analytical signals are not repetitive, from which fact it may be appreciated that the noise problem is severe.

Noise as affecting devices operating in the millivolt to microvolt range should be considered present in all operations and it cannot be removed, even in perfectly controlled laboratory conditions. There is always a possibility of transients in power distribution systems such as those caused by faults or lightning. Lightning can place noise spikes on all power distribution lines which are very difficult to remove and which are even passed by very sophisticated filters. Whereas such spike noise is considered to be high frequency, very low frequency noise, even in the subaudio range, is also harmful. For instance, devices slightly out of phase with the power distribution system will generate a beat frequency of only a fraction of a cycle per second, which will affect all equipment connected to the power distribution system. In addition, the drift in analytical transducers is considered as an additional source of low frequency noise. Slight variations in the thermal conditions of various analyzers cause drift which can easily be greater in magnitude than the base line voltage. Without going into greater detail, those skilled in the art will appreciate the statement that integrating devices to which the present invention relates are used with input signals as small as a microvolt or as large as 500,000 microvolts with the small signals obscured by noise of all frequencies and of all amplitudes.

Noise is particularly troublesome in two aspects for the case of a device which provides integration of the area of a bona fide fluctuation of an analytical signal. Firstly, noise superimposed on a bona fide fluctuation of an analytical signal can introduce an error into the integrated value obtained for the bona fide fluctuation. Secondly, noise, and particularly spike noise, can actually resemble a bona fide voltage fluctuation and can cause the erroneous recording of an apparent analytical data value even though no bona fide fluctuation has occurred.

To be considered apart from noise of various kinds is the additional problem of zeroing the analytical device itself. Obviously, it is too much to expect flame chromatographs or other analytical devices to maintain a precisely fixed zero for periods which extend upwards of 24 hours or more. Actually, the analytical device is in and of itself one source of false analytical information. Base line drift ts described hereinabove had been handled in times past by manning a strip chart recorder or other indicating devices connected to such analytical devices by an operator who visually examines the record and determines for himself what is actually base line drift and what is analytical information. However, such monitoring is burdensome and requires extensive attention of laboratory personnel and is therefore undesirable.

It is old in the art to utilize analog converter devices which vary or modulate the frequency of pulses which are counted in a counter connected to the converter device by a switch. Proper timing in operation of the switch to start and stop counting is achieved by monitoring the analytical wave form to be "integrated" as it is recorded on strip chart recorders. Such devices have obtained a rather minimum degree of success in times past because the operation of the switch to connect the pulse source to the counter requires visual examination or foreknowledge sufficient to guarantee that the peak voltage will not exceed the linear operating range of the apparatus. Switching of an attenuator during operation causes additional inaccuracies in the loss of proportionality between pulse outputs of the pulse source and further introduces a transient which is totalized erroneously. Foreknowledge has been obtained in times past by repeating the analytical process twice and using the first analysis to predict the vagaries of the second analysis and adjusting the apparatus to stay within the linear operating range of the equipment.

Analog converters which provide pulses at a frequency proportional to the voltage are adjustable to obtain higher output frequencies. Higher frequencies are obtained at the sacrifice of raising the minimum output frequency. It is difficult if not impossible to obtain a ratio of 500,000 or more between the maximum output frequency and the minimum output frequency in a simple yet reliable device.

One object of this invention is to provide a new and improved multirange integrating device which integrates the area of signal peaks.

An important object of this invention is to provide a new and improved multiple range integrating circuit which switches from range to range automatically while adjusting its ouput so that all units of integration are equal to one another.

A similar and related object of the present invention is to provide a new and improved wide range integrator which does not create voltage transients having an appearance similar to that of analytical signals.

An important object of the present invention is to provide a new and improved automatic integrating device which automatically switches from range to range to avoid exceeding the linear range of the device.

The principal object of this invention is to provide a new and improved integrating device which recognizes signal peaks and yet discriminates against switching transients arising from any source.

A further object of this invention is to provide a new and improved multirange integrator for use with analytical signals having a base line value and signal peaks which are automatically sized to avoid overloading without raising, shifting, or otherwise deviating the base line.

Another object of this invention is to provide a new and improved integrating device for analytical signals which operates completely within its linear range to avoid the necessity of utilizing an attenuator or similar device to thereby define a truly automatic device capable of extended, unattended operation.

An equally important object of the present invention is to provide a new and improved integrating device which outputs data for each peak in an analytical wave form in which the output data for each peak is proportional to that of all others. The integrating device of this invention is linear to within $\pm$ one-quarter percent $\pm$ two microvolts of actual signal value up to 600,000 microvolts.

A further object of this invention is to provide a new and improved integrating device which includes isolated means for connection of a strip chart recorder. Such means avoids the paralleling of the strip chart recorder with the input of the integrating device and the consequential transients or loading caused by the strip chart recorder.

Yet a further object of the present invention is to provide a new and improved integrator having multiple ranges and capable of switching from one range to another wherein any and all errors caused by switching upscale or switching downscale are avoided.

Still a further object of the present invention is to provide a new and improved circuit having very high sensitivity in detecting peaks, and more particularly in detecting peak onset and termination, without going beyond the linear operating range of the invention.

An additional object of the present invention is to provide a new and improved integrator providing the total area of a peak wave form by increments of area in which the increments of area are quite small to provide sensitivity for signals near base line and which increases the size of the increments while increasing the range of the integrator to obtain greater total integrals for representing relatively very large voltage peaks.

A similar and related object of the present invention is to provide a new and improved integrating device having a very sensitive peak detector which determines the presence or absence of a peak but which is never driven to saturation and is able to respond instantly to changing signal conditions.

Yet, another object of the present invention is to provide a new and improved integrating circuit totaling the area of a peak in multidigit format and which has two operating ranges with one being ten times greater than the other and wherein the factor of ten is absorbed in the multidigit area on switching to the greater operating range by inputting data at a point one decade above the least significant digit.

Still another object of the present invention is to provide a new and improved integrating circuit having a linear operating range of up to 60 millivolts from a base line value of one microvolt. A further object of the present invention is to provide a new and improved integrating circuit having another linear operating range of up to 600 millivolts.

Another important object of this invention is to provide a new and improved integrating circuit which enables the input signal to also be supplied to strip chart recorders or other similar devices without causing irregularity of loading on the signal source.

One advantage of the present invention is the provision of a new and improved voltage-to-frequency type of integrator which is as sensitive as one pulse output for each microvolt second input.

A further object of the present invention is to provide a new and improved integrating device having a pass band amplifier which is predominated by one high frequency and one low frequency roll-off circuit which defines the pass band of the amplifier wherein all other circuit elements capable of sufficiently shifting the phase of the signal and causing spurious oscillations or unwanted feedback become capable of significant phase shift only when the amplifier gain is so reduced by the two predominate roll-off circuits that the conditions required for spurious oscillations are never met.

Another development of the present invention is the provision of a pass band amplifier in an integrating circuit which is used to reject noise outside the pass band which co-operates with means compensating for the relatively slow response time of the pass band amplifier to enable the invention to integrate peaks without error.

A related object of the present invention is to provide a pass band amplifier in an integrating circuit which also avoids the effect of noise in the pass band.

Another object of the present invention is the provision of a voltage-to-frequency converter which has a very high maximum frequency while also having a base line (minimum) frequency which is exceedingly low (.001% or less) and which is quite stable without significant jitter at the minimum frequency.

A related object of the present invention is the inclusion of means providing feed back to a voltage-to-frequency converter which maintains accurate ground reference and base line adjustments and a consistent feed back percentage through all ranges of this invention.

Other objects and advantages of the present invention will become readily apparent from a consideration of the following description and drawings wherein:

FIG. 1 is a schematic block diagram of the integrating device of the present invention;

FIG. 2 is a schematic wiring diagram of an amplifier circuit;

FIG. 3 is a schematic wiring diagram of an amplifier and peak sensor means of the present invention;

FIG. 4 is a schematic wiring diagram of level sensor means and timing circuit means enabling the present invention to operate over multiple ranges;

FIG. 5 is a schematic diagram of the voltage-to-frequency converter of the present invention;

FIG. 6 is a graph of the input voltage to the voltage-to-frequency converter for a peak fluctuation causing the invention to operate through multiple ranges;

FIG. 6A is an enlarged view of a portion of FIG. 6; and

FIG. 6B is an enlarged view of another portion of FIG. 6.

Considering the invention broadly, FIG. 1 illustrates in block diagram form a preferred embodiment of the invention. Operation of the present invention is related with respect to the block diagram of FIG. 1 as a means of relating details of operation of individual circuits to the whole, and thereafter individual circuits will be described wherein overall operation provides a background for complete understanding of the invention.

Referring to FIG. 1, there is shown a wide range integrating unit or device 10 which is connected to a voltage source 12. This integrating device 10 includes the remainder of the apparatus shown in FIG. 1, with the exception of a printer and a solenoid driver for such printer. The voltage source 12 may be an analytical device such as a chromatograph or any other device which provides an output analog signal which has a base line value representative of some norm or standard and which has fluctuations extending from the base line value which fluctuations are information. The base line can be one microvolt or less and the signal peaks can exceed one-half volt. The source 12 is connected to a modulator 13 of the integrating device 10 for providing a modulated output signal on a conductor 14. The conductor 14 is communicated with an amplifier indicated generally at 15 which amplifies the output of the modulator 13 to a higher level. The amplified output of the modulated signal is carried by a conductor 16 to a demodulator 17 having an output conductor 18 which is communicated to three different circuits.

One output of the conductor 18 supplies the amplified and demodulated signal of the source 12 to a voltage-to-frequency converter indicated at 20. The voltage-to-frequency converter 20 produces an output pulse for each incremental area (of predetermined size) under the input signal wave form. Briefly, the converter 20 accumulates input current on a capacitor. When the capacitor is charged so that its voltage reaches a certain level, a finite, measured pulse of current of reverse polarity is added to the capacitor which diminishes the charge. The pulse of current is used to form a properly shaped pulse which is the converter output which is counted. If the input current to the capacitor increases, the number of output pulses increases so that the device linearly responds to an input signal whereby a total of the output pulses represents the integral of the area under the waveform. The converter 20 operates continuously to integrate all input signals and therefore has need of switch means, or more particularly, means for recognizing the presence or absence of a bona fide peak or voltage fluctuation in the input signal and for switching the converter 20 on and off.

The conductor 18 supplies the amplified and demodulated signal from the source 12 to a peak sensor amplifier 21 which drives a differentiating circuit indicated generally at 24 which detects slope of the input signal from the source 12 and which operates additional circuitry in response to certain slope conditions and obtains an indication of the presence or absence of peaks in the signal supplied by the source 12. The presence of a peak indication enables operation of a counter 55 which accumulates the pulses from the converter 20.

A third circuit is operated by the signal communicated by the conductor 18 from the demodulator 17. This circuit is the level sensor indicated at 25 which determines when the level or amplitude of the signal from the source 12 approaches a predetermined level to shift the integrating device 10 of this invention to another range of sensitivity to automatically and properly size the input signal for operation within the linear range of the present invention. If the signal is increasing, then the device shifts to a range of lesser sensitivity. Conversely, if the signal is decreasing, the device shifts to a range of greater sensitivity.

While operation of the three above-mentioned circuits merits explanation, such explanation is more meaningful after description of all components of the present invention 10 after which the detailed operation will be included.

The amplifier 21 is a DC amplifier which provides a differentiating circuit with an amplified input signal. The differentiating circuit 24 serves as means determining positive slope, negative slope or zero slope of the input signal. The differentiating means of the peak sensor includes a capacitor 26 and a resistor 27 connected to ground. The differentiating means 24 drives a DC amplifier 28 and a feed-back loop is closed around the amplifier 28 and connects dynamic loading means 29 to the differentiating means 24 which dynamic loading 29 enables rapid response of the differentiating means 24. In addition to the dynamic loading means 29, there is paralleled therewith overload means 30 which is connected by a conductor 93 to the level sensor 25. The amplified output of the differentiating means 24 which represents positive slope by voltage fluctuations above a voltage reference and negative slope by voltage fluctuations on the opposite side of the reference is connected to a pair of Schmitt triggers 34 and 35 which convert the signal levels from the differentiating means 24 to signals of the "off-on" variety which, for purposes of description, will be described as binary signals hereinafter. Of course, the dynamic loading circuit 29 and the overload protection circuit 30 affect the signals input to the positive slope Schmitt trigger 34 and the negative slope Schmitt trigger 35. A conductor 36 is indicated as communicating the peak sensor amplifier means 28 with the Schmitt triggers 34 and 35.

The Schmitt trigger 34 is connected to a conductor 39 and the Schmitt trigger 35 is connected to a conductor 40, and both conductors 39 and 40 communicate with a peak recognition circuit 41. In essence, the peak recognition circuit provides a signal having two levels with one level indicating the absence of bona fide fluctuation output by the source 12 while the other level indicates the presence of a peak in the output signal of the source 12. Such means indicating the presence or absence of a peak in the analytical signal input is used, as will be described to control a baseline control unit which, in turn, adjusts the operation of the V-to-F converter 20.

For a peak of conventional shape, the source 12 provides an output having slopes of zero, positive, zero, negative and zero slope which are recognized by the integrating circuit 10 to control the accumulation of output from the converter 20.

The voltage-to-frequency converter 20 provides its output of pulses on a conductor 45. The conductor 45 is connected to a servo driver 46. As mentioned above, base line drift is particularly onerous between peaks of the signal when the drift is relativly large with respect to the signal. The servo driver 46, being connected to the conductor 45, receives pulses output by the converter 20 and applied them to a level sensor device which compares the pulse rate output by the converter 20 at base line to a predetermined norm. It has been found that a standard base line definition of three or four pulses per second from the converter 20 is desirable. When the pulse frequency from the converter 20 deviates from the predetermined rate of three to four pulses per second, the servo driver 46 operates the servo 47 which obtains a feedback voltage from the wiper arm of potentiometer 48 included within a base line control circuit 50. The voltage obtained for the potentiometer 48 is input to the converter 20 by a conductor 51 and serves as a feed-back signal which adjusts the base line value at the converter 20 to maintain the base line at approximately 3 or 4 pulses per second.

The peak recognition circuit 41 is connected by a conductor 54 to the servo driver 46 and servo driver 46 responds to the output indication of the peak recognition circuit 41 which is in the form of a signal indicating the presence or absence of a peak to clamp or withhold operation of the servo driver 46 when a peak is present in the analytical signals. It is recognized that continued operation of the servo driver 46 during a peak will feed back a signal by the conductor 51 to the converter 20 to obliterate or mask out analytical fluctuations in the signal.

The servo driver 46 includes means averaging or rectifying the pulses on the condutcor 45 at base line conditions and compares such average value with a predetermined value. It will be recognized that the comparison may reflect a positive or negative relationship between the two values. The positive indication is used to operate a Schmitt trigger and the negative indication operates another Schmitt trigger with the pair of Schmitt triggers driving the servo 47 in opposite directions. Servo operation is continued until the servo driver obtains the desired base line whereupon both Schmitt triggers are not operated and the servo 47 is maintained at its last position.

When the peak recognition means 41 indicates the presence of a peak in the analytical signal, the position of the servo 47 is held through the peak.

Pulses output by the converter 20 to the conductor 45 are counted by a data counter 55 if they are passed through switch means 56. Switch means 56 is operated on and off to control admission of the pulses in the conductor 45 to the data counter 55 and also operates to switch the pulses on the conductor 45 into the counter 55 one decade higher in the counter 55. The conductor 54 which carries the peak indicating signal is applied to a logic control circuit 57 which supplies a signal over a conductor 58 to the switch means 56 for opening same for accumulation of pulses by the data counter 55 from the conductor 45. The binary signal on the conductor 54 indicates the presence of a peak as observed by the peak sensor means and peak recognition circuit 41 to operate the data counter 55 coincident with the peak from onset to termination. If desired, the data counter 55 may be connected to a numerical display indicated generally at 59. Data is transferred from the counter 55 into the memory 60 and the data counter is returned to reset as soon as the transfer of information is accomplished to quickly prepare the counter 55 for integration of a peak closely following the previously integrated peak. Information is stored in the memory 60 and is called out in sequence as will be described.

Of parallel function with the data counter 55 is a peak number counter 62 communicated with the logic control 57 by a conductor 63 which supplies a signal on the conductor 63 similar or even identical to the signal on the conductor 54 to give identifying numbers to each of the peaks. Peak numbering occurs without regard to the length of the peaks. Those skilled in the art will recognize that the device may count through zero and begin counting again without causing any confusion when the integrating apparatus 10 prints the total area of each peak and identifies each peak with one numeral.

A binary coded decimal converter 64 is connected to the memory 60 and the peak number counter 62 by conductors 65 and 66, respectively. The conductor means 65 makes available the four bits stored in the memory 60 for each of the digits finally indicated by the data counter 55 while the conductor means 66 provides data from the peak number counter 62. The decimal converter 64 receives information from the two abovementioned sources in binary coded decimal format and converts the information to decimal form. The converter 64 sequentially converts the numbers by scanning the memory 60 and peak counter 62 to transfer the numbers to the converter 64. The converter 64 provides an output on a conductor means 69 for each decimal and the means 69 are connected to individual solenoid drivers at 70. The solenoid drivers are positioned over and in proximity of the keys of a ten-key adding machine included in a printer 71. Referring operation of the printer 71 to the converter 64, information is converted from the binary form to the decimal form in sequence and the solenoid driver 70 punches the appropriate key on the printer 71 to transfer information into the printer 71 as the keys are depressed.

On the conclusion of a peak as indicated by the absence of a signal in the conductor 54, and after transfer of data from the counter 55 into the memory 60, a signal is supplied by a conductor 74 to a scanner means indicated generally at 75. The means 75 is triggered by the signal to start operation of sequential outputs carried by conductor 77 connected to the decimal converter 64. Conductor means 77 carries "enable" signals to the decimal converter 64 in sequence which enables sequential acceptance of data in the memory 60 and the peak number counter 62. As an example, if the memory 60 has seven digits of information and the peak memory counter has one, conductor means 77 supplies eight sequenced signals which transfer the bits of information by conductor means 65 into the converter 64 in sequential order which enables operation of the solenoid drivers 70. After the scanner 75 transfers the data from the memory 60 and the peak memory counter 62 to the printer 71, the last signal in the cycle of the scanner means 75 is carried to the printer 71 by a conductor 78 which operates the printer 71 to imprint the numerical information stored in the printer 71 to transfer such information to paper tape or the like. Conclusion of the printer operation completes the cycle of operation occurring with respect to a peak wave form and all data handling apparatus including the scanner 75, logic control 57, and data counter 55 is returned to the quiescent state in preparation for acceptance of a subsequent peak which requires repetition of the above-described operation.

The above-described operation is based on the assumption that the peak wave form is generally bell-shaped and has only positive slope, zero slope, and negative slope between onset and termination with both onset and termination occurring at base line value. While this is ideally the expected wave form, other wave forms do occur. Various means which assist in integration of differently shaped curves are included with the integrator 10 of this invention and are shown connected to logic control 57.

By way of example, the output of the source 12 may have a base line value which may, on occasion, deflect and have the appearance and slope of a bona fide voltage fluctuation without a peak or termination. Plateaus in the base line should not be recorded as analytical information because it results from a change in conditions and is not analytical. Such a plateau is indicated by the occurrence of positive slope and an indeterminately long zero slope. A plateau timer 80 is communicated by a conductor 81 to the logic control 57 and operates through same to prevent data print out for plateaus. Since a plateau is indicated by the continued occurrence of zero slope after an initial positive slope, an adjustable RC or motor-driven timer in the plateau timer 80 measures the length of the plateau. If the plateau exceeds the predetermined interval, the plateau timer 80 operates to supply a signal over the conductor 81 to the logic control 57 to switch off the switch 56, reset the counter 55, and transfer information from the counter 55 into the memory 60. The memory 60 is reset with operation of the scanner means 75 withheld. Resetting of the memory destroys all data in the invention and returns it to a prepared state for onset of a bona fide peak.

Considering another voltage wave form which is sometimes encountered, there is provided a minimum peak timer means 82 connected by a conductor 83 to the logic control 57 which means measures the length of peaks from the source 12 and rejects those shorter than a predetermined minimum time. The minimum peak timer 82 is adjusted to define the minimum time and prevents print out by the printer 71 of the total count accumulated in the counter 55 for a below-standard peak. The minimum peak timer 82 measures the length of time of occurrence of the signal on the conductor 54 indicating the presence of a peak as recognized by the peak recognition means 41. Should the minimum peak timer 82 time out, the signal is carried over the conductor 83 to the logic control means 57 which signal is a prerequisite for operation of the scanner means 75. If the peak falls short of the minimum time required by the peak timer 82, the signal on the conductor 83 is withheld and the scanner means 75 is not operated. The data is transferred from the counter 55 into the memory 60 but it is not sequentially scanned by operation of the scanner means 75 in cooperation with decimal converter 64.

It is possible for large peaks to overlap smaller trailing peaks whereby the signal obtains a maximum value and has negative slope interrupted by zero slope indicating the maximum value of the smaller peak. The conductor 45 is conected to a threshold level detector 84 communicating by a wire 85 with the logic control 57. The pulse rate output by the converter 20 is measured to determine return to the base line rate of about three or four pulses per second. The threshold level detector 84 provides a signal at the end of a peak as recognized by the recognition means 41 if the pulse rate in the conductor 45 exceeds the preset minimum and the signal is communicated by the means 85 to the logic control 57 to restart the logic 57. This is most desirable because it effects a division of the run-together peaks and obtains a separate integral for each of the peaks.

The preferred means of obtaining two signals indicating the presence of two peaks is by supplying the level detector 84 signal to the peak recognition circuit 41 to resemble the output of Schmitt trigger 34 to restore the peak signal on the conductor 54. The signal subsists until the negative slope Schmitt trigger 35 operates in cooperation with the peak recognition means 41 to indicate the end of peak when the signal from the source 12 returns to base line value at termination of the last of the two peaks run together to appear as one. Reference is made to the foregoing description of the operation of data counter 55, memory 60, converter 64, and scanner means 75, whereupon it will be appreciated by those skilled in the art that the printer 71 obtans an output for each peak separate and apart from the other.

A positive re-entry circuit 86 is connected to the logic control circuit 57 and provides means for integrating small unresolved peaks followed closely by a larger peak. The wave form of the analytical signal has positive slope, zero slope and positive slope in reaching a maximum value. The circuit 86 is preferably similar to the circuit 84 in effecting a division of the signal in the conductor 54 indicating the presence of two peaks. When the analytical signal passes through zero slope indicating the peak value of the unresolved small peak and then becomes greater in value, a negative signal is effected to simulate the end of peak in the peak recognition circuit 41 to define the presence of the first peak. The positive slope signal from Schmitt trigger 34 defines the presence of the second peak. The preferred means of obtaining the negative signal to simulate the end of peak is differentiation and inversion of the positive slope occurring after zero slope with the first positive slope signal enabling operation of the positive re-entry means 86.

As previously mentioned, the source 12 is usually connected to a strip chart recorder or other visual indicator which includes internal circuitry which loads the source 12, and is reflected into the integrator 10 if it is connected in parallel with the recorder. With a view of removing this load from the source 12, the present invention includes an amplifier 90 taking the signal from the conductor 18 and providing an output of the amplified signal for connection to a recorder. The amplifier 90 is connected by a wire 91 to the level sensor 25 which provides a signal switching the amplifier 90 between two gain settings. For instance, the amplifier 90 might provide a gain of one at the lowest setting and a gain of ten at a higher setting. Such device may include, by way of example and not limitation, an output emitter follower having a pair of emitter resistors with a ratio of nine to one between such resistors whereupon a relay operated by the signal in the conductor 91 selects the output signal from the smaller resistor in the low gain operating range. Higher gain in the amplifier is achieved when the signal in the conductor 91 operates the relay to derive the output signal across both resistors wherein the total resistance is ten times greater and the voltage is therefore ten times greater.

Another conductor 92 is conencted to the amplifier 15 and causes the amplifier to operate at one of two gain settings wherein the larger gain setting is ten times greater than the small gain setting. It will be appreciated that operation of the amplifier 15 affects the signal on the conductor 18 which supplies the amplified and demodulated signal to various portions of the circuitry as described hereinabove.

The conductor 18 supplies the amplified signal to the peak sensor means including the differentiating means 24 connected to a DC amplifier 28. As previously mentioned, the differentiating means 24 detects positive or negative slope but it is also required to have quick response. It can be appreciated that the time required to discharge various capacitors in the circuitry on switching gain in the integrator 10 is not negligible, and for control of the overshoot, a conductor 93 is connected to the overload protection circuit 30 to switch the circuit into the feedback loop around the DC amplifier 28 to prevent saturation of the peak sensor means.

As mentioned hereinbefore, the V-to-F converter 20 is adjusted at some zero value and co-operates with the servo driver 46 to seek a base line value between peaks in the wave form output by the source 12. However, changing the gain of the amplifier 15 in response to operation of the level sensor 25 affects the base line value input to the V-to-F converter 20 so that it is not possible to use any arbitrary base line value other than true zero reference. To this end, there is included the base line control 50 which is switched by a signal supplied over a conductor 94 and which includes means providing a true zero setting.

The level sensor 25 supplies the signal over the conductor 92 to the amplifier 15 to alter the gain of the integrator 10 by a factor of 10. This changes the proportionality of the pulses output by the converter when the amplifier 15 is operating at its low gain setting to represent time integrals of current which are ten times greater. Graphically speaking, this means that the area represented by a pulse is a unit area under a current wave form existing over a period of time and is tenfold greater because of the decrease in gain in the amplifier 15. The conductor 95 conducts a signal to the switch 56 which, in effect, inputs the pulses on the conductor 45 into the data counter 55 after bypassing the least significant decade counter in the counter 55. This has the effect of dividing the number of pulses in the conductor 45 by a factor of ten so that the quantity recorded by the data counter 55 is properly sized and the units recorded by the data counter 55 are proportional to one another without regard to changes in the gain of the integrator 10.

While the foregoing describes the invention as will be recognized by those skilled in the art, attention is directed to FIG. 2 for further elaboration with respect to the amplifier 15. The modulator 13 is shown in block form and it supplies a signal to an input transformer 100. The secondary of the transformer 100 is connected to a transistor 101 which provides a stage of amplification. The low side of the transformer 100 secondary is connected to a biasing circuit and receives a feedback signal, all of which will be described after the description of the amplifier proper whereupon the feedback loop will be closed. The transistor 101 includes emitter resistor 102 and has a pair of resistors 103 and 104 in the collector circuit. Decoupling is achieved by connecting a capacitor 105 to ground and the output signal is taken from the collector and applied to the base of a transistor 106. The output is also connected to ground through a capacitor 107. The capacitor 107 grounds high-frequency components in the signal amplified by the transistor 101.

The transistor 106 is an emitter follower having an emitter resistor 108 while the collector is connected directly to the supply voltage in a conductor 110. An additional emitter follower 112 is connected to the transistor 106. The emitter follower 112 likewise has its collector connected directly to the voltage supply 110 and its emitter is connected to ground through an emitter resistor 113. A coupling capacitor 114 communicates the signal output by the emitter follower 112 to a voltage divider including resistors 115 and 116.

A relay 118 operates its relay contacts 118a to select a voltage from the voltage divider which is communicated through a capacitor 119 to the next stage of amplification. The resistor 115 is approximately nine times greater in value than the resistor 116 so that actuation of the relay 118 operates the relay contacts 118a to obtain a voltage which is one-tenth in amplitude compared with the voltage obtained in the unactuated position of the relay. The relay coil has two leads, one of which is connected to minus 35 volts DC and the other is conductor 92 communicating with the level sensor 25 as shown in FIG. 1.

The capacitor 119 is connected to the base of a transistor 124 which is biased at a point of operation by a resistor 125 connected to ground and a resistor 126 connected to the collector resistor 127. Decoupling is obtained by a capacitor 128 which is connected to ground from the collector resistor 127. Output signal of the transistor 124 is taken across the emitter resistor 129 and communicated by a resistor 130 to another transistor 131. In actuality, the transistor 131 obtains its base voltage from a voltage divider including resistor 133 connected to the supply conductor 110 and the resistor 134 which is connected from the base to ground. The resistor 130 supplies signal from the transistor 124 through the emitter resistor 135 for the transistor 131. The interconnection of the emitter resistors 129 and 135 serves as one means of relating operations of the transistors 124 and 131 whereby thermal drift or thermal runaway of either transistor is opposed by the characteristics of the other transistor. Thus, the arrangement provides means whereby amplification is obtained without gain drift caused by temperature fluctuations, with the output voltage of the stage developed across collector resistor 136 connected to the supply conductor 110.

The bases of transistors 124 and 131 are connected together by a pair of side-by-side diodes 142 and 143 which sreve as means keeping the base voltages reasonably close together. It may be appreciated that the forward voltage drop of each diode limits the fluctuations of the transistor bases to within such range but as a practical matter, current seldom flows through either of the diodes.

The signal developed across the resistor 136 is connected to the base of an emitter follower 138. The collector of the emitter follower 138 is connected directly to the conductor 110 and the signal is developed across a resistor 139 which is connected to ground from the emitter. A coupling capacitor 140 obtains the emitter signal from the transistor 138 while blocking the DC level of the emitter.

The signal output by the emitter follower 138 is applied to another stage for amplification which stage is identical in design to the stage including the transistors 124 and 131 which are connected to obtain thermal stability. A pair of transistors 144 and 145 is connected to the supply line 110 by collector resistors 146 and 147, respectively, and are communicated by emitter resistors 148 and 149 with a signal ground. The extent of voltage fluctuations amplified by the transistor pair 144 and 145 is sufficiently great that a conductor 150 communicated with +45 volts is used for a signal ground for the emitter resistors 148 and 149. The stage of amplification is connected between 63 volts potential difference to permit amplification of large signals. The emitters of the transistors 144 and 145 are connected together by a resistor 151. The bases of both transistors 144 and 145 are connected to the positive supply line 150 by resistor 152 and resistor 153, respectively, and the base operating conditions are further supplied by the connection of the resistors 154 and 155 to the collector and the supply line 110, respectively. Decoupling of the collector circuit is obtained by a capacitor 156 which is connected to the conductor 150 as signal ground. The collectors of both transistors 144 and 145 are clamped at ground potential by grounded diodes 158 and 159, respectively.

The transistors 144 and 145 co-operate to prevent thermal drift or runaway while yet providing amplification. The bases of the transistors 144 and 145 are connected together by diode pairs indicated at 163 and 164 which diode pairs are in side-by-side connection whereby the bases of the transistors are maintained within fixed voltage range of one another. Specifically, the voltage between the bases is maintained within a range of twice the forward voltage drop of the diodes when conducting.

The amplified output of the thermally compensated stage of amplification is applied to the base of an emitter follower 166 having its emitter connected to the negative supply in the conductor 110 by a resistor 167 and further having a collector resistor 168 connected to the conductor 150 for supplying positive voltage for the NPN transistor. The output signal is communicated by a blocking capacitor 169 through a series resistor 170 to the conductor 16 which communicates with the demodulator 17 as shown in FIG. 1.

As mentioned hereinbefore, feedback is closed with a feedback loop around the amplifier 15 which feedback loop obtains feedback voltage from the emitter follower 166 by connection of a blocking capacitor 172 to the emitter. Since the amplifier 15 is provided with two gain settings by the relay 118, a second set of relay contacts 118b is utilized to switch feedback resistors whereby the percent of feedback is maintained constant even when changing internal gain of the amplifier. The relay contact 118b in the unactuated position communicates a resistor 174 with the low voltage end of the secondary of the input transformer 100 as illustrated in FIG. 2. Actuation of the relay 118 to reduce the gain by ten connects a resistor 175 in the feedback loop and the resistor 175 is one-tenth the size of the resistor 174. The feedback signal is input to the low voltage end of the transformer secondary which is also connected to ground by a resistor 176 and diode 177 which prevent the transformer secondary voltage from becoming too negative. The diode 177 is connected to a resistor 178 communicating the secondary with a negative bias voltage from a resistor 179 and another resistor 180. A decoupling capacitor 181 grounds AC signals or noise in the bias circuit. The circuitry provides the quiescent operating voltage for the transistor 101.

Attention is directed to FIG. 3 which illustrates in schematic detail the amplifiers 21 and 28 and differentiating means 24. A series dropping resistor 190 co-operating with a diode 191 and negative bias source 192 provides gain roll-off control for the amplifier 21. Specifically, input signals of small amplitude are slightly attenuated by the series resistor 190. Conversely, the current flow through the resistor 190 to ground through diode 191 is appreciable for large input signals whereby the signal input to the amplifier 21 is reduced. This effects an expansion or enlargement of input signals near the base line to enhance the ability of the peak sensor means to detect peak onset and termination and prevents large voltage swings to prevent saturation of the amplifier circuitry.

The input signal is applied to the base of an NPN transistor 195 and the amplified signal is developed across a collector resistor 196 which is connected to a supply conductor 197 communicating a positive voltage to the transistor 195. The transistor 195 includes an emitter resistor 198 which is connected to a negative supply line 199. Emitter fluctuations below ground potential introduce additional parallel resistance in the form of a resistor 200 connected to ground through a diode 201. The amplified signal is connected to a selectable filter by means of a switch 202 which connects any one of three capacitors 203, 204, and 205 to the transistor 195. The selected capacitor co-operates with the collector resistor 196 to serve as a low pass filter and provides an AC path to ground for the high-frequency components of the signal. It may be appreciated that the filtering means is particularly effective on noise. The amplified signal is derived from the collector of the transistor 195 and applied to the base of a transistor 208.

Transistor 208 has a collector resistor 209 and emitter resistor 210 with the amplified output taken from the collector of the transistor 208 and applied through a switch 211 which selects capacitor 212, 213, or 214 to serve as additional low pass filter means. The amplified signal is then applied to the base of an NPN transistor 216 having a collector resistor 217 connected to the supply line 197 and an emitter resistor 218 connected to the negative supply line 199. Transistor 216 is used as an emitter follower. The emitter is prevented from becoming excessively negative by the grounded diode 219. The output of the emitter follower 216 is supplied to the capacitor 26 which differentiates the signal and develops a signal representative of the derivative at the point 222 and across the grounded resistor 27. Since the differentiated signal appears at the point 222 while feedback is closed to the point 222, operation of the amplifier indicated generally at 28 is best initially detailed and the description of feedback loop will follow thereafter.

The signal at the point 222 is applied to transistor 224 which is connected to the positive supply line 197 by a collector resistor 225 and is connected by an emitter resistor 226 to the negative supply conductor 199. The amplified output is derived from the collector of the transistor 224 and is connected through a series dropping resistor 227 and applied to the base of an emitter follower stage as will be described. However, there is included with the transistor 224 an additional transistor 230 whereby thermal stability of the transistor 224 is assured.

Specifically, transistor 230 shares its emitter resistor 231 with the transistor 224 by connection of a resistor 232 between the emitters of the transistors which relates the emitter voltages of the two transistors to one another. The transistor 230 includes a collector resistor 233 connected to the conductor 197. A base bias supply including series resistors 234, 235, and 236 is connected between the positive and negative supply lines and is connected by a resistor 237 to the base of the transistor 230. Additionally, the base of the transistor 230 is connected to ground through a capacitor 238, and a resistor 239 is also connected to ground from the bias supply. The circuitry adjusting the bias for the transistor 230 is preferably set once the thermal characteristics of the transistor 230 have been matched against the thermal characteristics of the transistor 224 so that the stage of amplification does not drift with temperature.

The amplified signal conducted through the series resistor 227 is applied to the base of a transistor 242 serving as an emitter follower. The transistor 242 includes a collector resistor 243 and an emitter resistor 244 across which the output signal is developed. The operating point of the transistor 242 is determined by a bias supply including a resistor 245 and potentiometer 246 which supplies current through a tap resistor 247 communicated with the base of the transistor 242. High-frequency signal components in the amplifier 28 are grounded through a switch 248 which selects one of three capacitors 249, 250, or 251. The emitter follower 242 which functions as a current amplification device applies the output signal to the base of a transistor 253 which is also an emitter follower. The transistor 253 includes a collector resistor 254 connected to the negative supply line 199 and an emitter resistor 255 across which the signal is developed. The output signal of the emitter follower 253 is carried by the conductor 36 to the dynamic loading circuit 29 and the overload protection circuit 30 as indicated in FIG. 1. In the preferred embodiment of the invention, the conductor 36 is connected to diodes 258 and 259 in the illustrated manner. Feedback signal is conducted by a conductor 260 to the point 222 of the differentiating means 24. In addition, the overload protection circuit 30 includes a resistor 262 paralleled with the diodes 258 and 259 and a relay 263 which switches the resistor 262 into the circuit. The relay 263 derives an actuation signal from the level sensor 25 through the conductor 93

The output signal of the dynamically loaded amplifier 28 at the conductor 36 maintains a quiescent condition at zero slope and is deflected in either direction from the quiescent value by the presence of slope. Deflection on either side of the quiescent point is indicative of the slope condition of the signal supplied by the source 12. It may be appreciated that the extent of slope or the steepness of the signal is immaterial to operation of the device of this invention at the point 36, just so the fluctuations from the quiescent condition in the conductor 36 are sufficient to operate the Schmitt triggers 34 and 35. The dynamic loading means 29 assists the amplifier 28 to rapidly respond to changing signal conditions.

The level sensor 25 is illustrated in detail in FIGS. 4A and 4B which shows the preferred form of means for determining input signal amplitude relative to a predetermined level whereby gain of the integrator 10 of this invention is decreased by tenfold. The level sensor 25 includes means for detecting an input signal of 50 millivolts from the source 12 but it reduces gain of the integrator 10 by tenfold and maintains the reduced gain until the input signal falls to below 40 millivolts. This arrangement may be considered as antihunting means which prevents chatter or repetitive switching for voltage levels which approach the preselected level of 50 millivolts asymptotically.

The conductor 18a provides the level sensor 25 with the amplified signal from the voltage source 12. The input is to a resistor 275 and high-frequency AC components of the signal are grounded by a capacitor 276. The first stage of the level sensor 25 includes an emitter follower transistor 277 having a collector resistor 278 connected to +45 volts and having a voltage divider including resistors 279 and 280 connected to a negative supply line 281. Two signals are derived from the emitter of the transistor 277 as will be described in greater detail hereafter.

The output of the voltage divider including the resistors 279 and 280 is applied to the base of a transistor 284 having a collector resistor 285 with the emitter connected to a Schmitt trigger. Output of the transistor 284 is applied through a biasing network including resistors 286, 287, 288, and clipping diode 289 to a transistor 290. The input current flows through the resistor 288 to the base of a transistor 290 which shares a common emitter resistor 291 with a second transistor 293. Feedback from the collector of the transistor 293 through a resistor 294 is connected to the base of the transistor 290 for relating operation of the transistors 290 and 293. Transistor 290 has a collector resistor 295 and transistor 293 includes collector resistor 296 with both resistors connected to collector voltage supply line 281. The operating point of the transistor 293 is adjustably controlled by a bias supply including series resistors 297, 298, and 299 which connect between the negative supply 281 and the positive supply 300. The Schmitt trigger output is obtained from the collector of the transistor 290 and is clipped by a grounded diode 301 which prevents the collector voltage on the transistor 290 from going positive. An emitter follower 302 supplies the Schmitt trigger output to logical circuitry to be described.

An increasing signal on the conductor 18a input to the level sensor 25 which triggers operation of the Schmitt trigger tends to cut off current flow through the transistor 290 and turns on the transistor 293. Current flow through collector resistor 295 tends towards zero to achieve level switching at the emitter follower 302 from approximately ground potential (clamped by the diode 301) toward the negative voltage on the conductor 281. Ground potential is considered a logical "zero" and negative voltage output by the emitter follower 302 is considered to be a logical "one." The output of the emitter follower is supplied by a conductor 304 to logical circuitry which will be described.

Switching of the level sensor 25 is conditioned on achieving about 50 millivolts input signal from the source 12 which level is recognized by the Schmitt trigger including transistors 290 and 293. Thereafter, additional circuitry in the level sensor 25 recognizes the input of 40 millivolts, diminished or reduced tenfold. With regard to the actual voltages applied to the level sensor 25, the low voltage Schmitt trigger to be explained recognizes signals below two volts.

The low voltage Schmitt trigger derives its input signal from the input emitter follower 277 with the emitter of the transistor connected by a resistor 310 and parallel diode 311 for inputting the signal to the base of a transistor 312. The base is connected to the voltage supply 300 by means of a resistor 313 and the collector resistor 314 is connected to the negative supply conductor 281. The transistor 312 shares a common emitter resistor 315 with a second transistor 316 which includes a collector resistor 317 connected to supply conductor 281. The operating point of the transistor 316 is provided by a bias source including resistors 318, 319, and 320. A resistor 321 communicates the collector of transistor 316 with the input signal and the output of the Schmitt trigger is derived at the collector of transistor 316 and clamped by grounded diode 322. An input signal above a certain predetermined amplitude decreases the gain of the integrator 10. Such decreases in gain terminates operation of the Schmitt trigger including transistors 290 and 293 but does not drop the input voltage sufficiently low to cause operation of the Schmitt trigger including transistors 312 and 316. This avoids hunting when the signal is close to the predetermined level, yet causes down switching of integrator gain wherein it is preferable to let the voltage fall therebelow before increasing the gain tenfold in the integrator. Therefore, the Schmitt trigger including transistors 312 and 316 is set to operate on an input signal of approximately two volts which input signal forms binary levels supplied by emitter follower 323 to logical circuitry through a conductor 324.

The conductors 304 and 324 are connected to a pair of NOR gates which are latched together. The NOR gates 325 and 326 connect to output conductors 327 and 328, respectively. When the input signal rises above the predetermined level and triggers the high level Schmitt trigger including transistors 290 and 293, the signal in the conductor 304 is changed to a logical one. A logical one on the conductor 304 requires an output of logical zero in the conductor 327 which logical zero is also inputted to gate 326. The zero input on the conductor 324 to gate 326 provides that gate with two zero inputs and results in a one output on conductor 328 which latches gate 325. When the input signal exceeds the predetermined level of 25 volts, the Schmitt trigger operating on high voltage causes the amplifier 15 to decrease its gain by tenfold. This drops the input voltage of the level sensor below 25 volts which is the predetermined level. The binary one output by the Schmitt trigger including transistors 290 and 293 is removed but the removal of the binary one from the gate 325 has no effect, for the gate is latched by connection to the output conductor 328 of the other gate. Thus, the drop in input voltage below 25 volts to some value above two volts produces no change.

When the input signal for the level sensor (with the integrator 10 operating at reduced gain) drops below the predetermined level of two volts, the Schmitt trigger including transistors 312 and 316 provides a binary one in the conductor 324. This requires a binary zero in the conductor 328 which reverses the condition of conductor 328. Likewise, the zero on the conductor 328 which is inputted to the gate 325 co-operates with the zero in the conductor 304 to provide a binary one output in conductor 327. The change in input voltage which drops below two volts reverses the binary condition in both conductors. As will be detailed hereinafter, decrease of the input signal of the level sensor 25 below the two volt level alters the gain of the amplifier 15 by supplying a signal over the conductor 92 which increases the gain tenfold. This immediately jumps the input voltage from something below two volts to a level ten times greater but still below 25 volts. This change takes away the binary one output on the conductor 324. This has no effect on the output of gates 325 and 326. Thereafter, as the signal provided by the source 12 returns towards base line value the input voltage for the level sensor again drops below two volts, which again provides a binary one on the conductor 324. However, this imposes a condition previously established at the input of gate 326 so that no change is registered in the output conductors 327 and 328. They continue to maintain a binary one in the conductor 327 and a binary zero in the conductor 328 and are changed only by inputting of a signal greater than 25 volts to the level sensor 25.

Attention is directed to FIG. 6 which illustrates the input voltage for the level sensor 25 with respect to time for a typical wave form. The interval of reduced gain is represented by the arrow 330 and it is directly related to the logical circuitry switching detailed hereinabove. However, delay circuitry is included in the schematic diagram of FIG. 4B to accomplish certain functions with respect to compensation of the wave form illustrated in FIG. 6 whereby all errors are cancelled and the indications accumulated by the counter 55 are accurately totaled. In FIG. 6, the actual advent of gain switching is denoted by the symbol T whereas switching of the input signal to the tens counter in counter 55 is delayed to the time indicated at T' in FIG. 6. Additionally, the time at which gain is increased in the integrator 10 is indicated in FIG. 6 by the symbol X whereas an event referenced to X is indicated by the symbol X' in FIG. 6. The purpose of these time delays will become more clearly evident after the following explanation.

Conductor 328 is connected to an input diode 329 and series resistor 336 for a switching transistor 337. Transistor 337 is biased off by resistor 338 and has a collector connected to a negative supply such as minus 35 volts through a diode 339. The span of time represented by the arrow 330 in FIG. 6 begins with time T and terminates with time X as shown in FIG. 6. This is the interval of reduced gain without any time delay so that certain commands by the level sensor 25 are achieved by the output signal of transistor 337. Transistor 337 is connected to the conductor 92 and the amplifier 15 as shown in FIG. 1. In addition, the transistor 337 is connected to the base line control 50 as shown in FIG. 1 by the conductor 94.

Certain transients occur in the integrator 10 when the gain is reduced by tenfold at time T. For one thing, amplifier 15 which was previously described as a narrow band amplifier including means rejecting noise across a broad frequency spectrum does not instantly respond to the step function input caused by reducing gain in the amplifier by tenfold. The amplifier output tends to decay as shown in enlarged view at FIG. 6A wherein the dotted line 350 represents the desired output of the amplifier but which is obtainable only with an infinitely broad band amplifier. Since the actual voltage 351 tends to decay and approaches the dotted line 350, it may be appreciated that the area enclosed between the dotted line 350 and the actual voltage 351 is, in fact, the measure of error. The area between the curves 350 and 351 represents positive error, but the accumulation of pulses in the counter 55 is delayed to the time T' to create a negative error in the counting of pulses occurring between the times T and T' when the pulses are added at only one-tenth of their actual value. Delay to time T' is accomplished by circuitry connected to the conductor 327.

In addition, the increase of gain at time X requires a step function output of the narrow band amplification means shown in FIG. 6B as the dotted line 352, whereas the actual output signal of the amplifier means in the integrator resembles the curve 353.

The time interval from the time T' to time X is represented by the arrow 358 in FIG. 6 while the interval from time T to time X' is represented by arrow 356.

The conductor 327 is connected to resistor 360 and supplies signal to the base of the transistor 361. The base is connected to the positive supply line 300 by a resistor 362 and includes series resistors 363 and 364 in the collector circuit which are connected to the negative supply line 281. A capacitor 365 is connected across the transistor 361 and is charged from the supply line 281 by a resistor 366. In addition, a diode 367 communicates the capacitor 365 with the collector circuitry of the transistor and a second diode 368 provides a connection from the capacitor 365 to a second transistor 369. Transistor 369 has a collector resistor 370 and is provided with emitter voltage by a voltage divider including resistors 371 and 372. A diode 373 is connected from the base to the emitter and the base is returned to the positive voltage in the conductor 300 by a resistor 374. The collector of transistor 369 is shunted to ground through capacitor 375.

While voltage levels representing binary zero or binary one are input to the transistor 361 and such voltage levels are switched with sharp definition and fast rise times, the inclusion of the capacitor 365 which is effectively connected across the transistor 361 provides an exponential decay in the output of the circuit. With binary zero being approximately ground potential and binary one being some negative voltage such as 8 or 10 volts below ground potential, the sharp rise time output by logical circuitry in switching levels to binary zero tends to cut off current flow through transistor 361 so that the collector potential almost achieves the negative voltage in the conductor 281. Diode 367 conduction is blocked whereby current flow through the resistor 366 increases the charge across the capacitor 365 as the voltage becomes more negative exponentially. The drop in the potential at the cathode of diode 368 also carries the base potential of transistor 369 to a more negative value which increases current flow through transistor 369 and its collector resistor 370. Since this current flow is exponential and is reflected by the voltage at the collector of transistor 369, the signal applied to a Schmitt trigger causes operation at a delayed time when the voltage passes a predetermined level resulting in the output of a step function from the Schmitt trigger.

The transistor 369 is connected to the base of transistor 380 which shares a common emitter resistor 381 with a second transistor 382. Transistor 380 has a collector resistor 383 while transistor 382 includes collector resistor 384 and both resistors are connected to conductor 281. Base voltage for the transistor 382 is provided by resistor 385 connected to conductor 281 and resistor 386 which is grounded. The base of transistor 382 is communicated by resistor 387 to the collector 380 and the output signal of the Schmitt trigger is communicated through a Zener diode 388 to emitter follower 389. A collector resistor 390, emitter resistor 391, and base resistor 392, which is connected to positive voltage conductor 300, complete the emitter follower 389.

The Schmitt trigger operates at the collector of transistor 380 to switch off current flow through transistor 380 and collector voltage on the transistor 380 becomes negative. This switching of levels is communicated through the Zener diode 388 which provides a constant voltage drop to shift the levels of the Schmitt trigger. The level switching is current amplified by the emitter follower 389 and applied through the conductor 95 which communicates with the switch means 56 as represented in FIG. 1. The signal in the conductor 95 represents logical switching which is delayed by the time interval represented between the times T and T' in FIG. 6 when the input is switched from a binary one into a binary zero. Graphically this is represented by the delay to T' and indicates the beginning of the time interval represented by the arrow 358 in FIG.

6. Termination of the arrow 358 coincides with the time X which is not delayed as will be explained.

As mentioned above, the delayed point of operation represented by time T' is achieved when the input signal to the delay circuitry switches from a binary one to a binary zero. When the input signal is switched from binary zero to binary one, there is no delay. The capacitor 365 is discharged by current flow from the collector circuit of transistor 361. The inputting of a step function from approximately ground potential (binary zero) to about −8 or −10 volts draws a large current in the collector resistor 364 which tends to make the anode of diode 367 positive. Current flows through the diode 367 to assist in rapid discharge of capacitor 365. The positive going signal on the capacitor 365 blocks conduction through diode 368 whereby the resistor 374 communicating with conductor 300 at positive ten volts tends to cut off conduction through transistor 369. This rapid cutoff is communicated to the Schmitt trigger including transistors 380 and 382 and switches transistor 380 on while tending to cut off transistor 382. This is the output through Zener diode 388 and conductor 95 and is represented by switching from a logical one to a logical zero in conductor 95.

The conductor 95 provides the signal achieving the changes in the decade counter 55 over an interval of time represented by the arrow 358 in FIG. 6. Circuit means 56 effectively multiplies pulses input over the conductor 45 to the decade 55 by an amount inversely proportional to the factor by which gain in advance of the V-to-F converter 20 is reduced. That is to say, circuit means 56 assures that counter 55 records units of area under peak fluctuations which are equal.

Data is counted by the data counter 55 in response to a signal provided from the logic control circuit 57 over the conductor 58. Conductor 58 is connected to NOR gates 400 and 401 and the conductor 45 is also connected to the gates 400 and 401. A binary one on the conductor 58 requires an output of binary zero at both gates 400 and 401 which is maintained regardless of pulses from the conductor 45. On command of a binary zero in the conductor 58, the conductor 45 inputs pulses to both gates 400 and 401 which develop output signals for counting in accordance with control exerted by the signal on the conductor 95.

The level sensor 25 determines whether the pulses on conductor 45 are to be counted in a unit decade counter 55a or are to be input to tens decade counter 55b. The level sensor 25 supplies a signal over the conductor 95 which is connected to a NOR gate 402 which derives an additional input from a NOR gate 403. The gate 402 is connected to the gate 401 by a conductor 405.

In operation, the level sensor 25 controls the inputting of pulses to the units counter 55a by providing on the conductor 95 a binary zero to gate 402. The pulses to be counted are input by the conductor 45 to gate 400 and gate 400 is connected to the units counter 55a. Units counter 55a counts cyclically through ten and repeats itself. It may be appreciated that counter 55a has an internal condition expressed in terms of four bits as will be understood by those skilled in the art. The internal condition can also be represented by not bit signals which are provided to the gate 403. When the units counter 55a passes through nine, two binary zeroes are inputted to the NOR gate 403 which outputs a binary one supplied to gate 402. The binary one at gate 402 passes a zero through a conductor 405 to gate 401. Zero signals on conductors 58 and 405 cause the gate 401 to direct a pulse to the tens counter 55b from the conductor 45. For the time of one pulse, both counters 55a and 55b are advanced one count. But this condition exists for only one pulse because the units counter 55a passes beyond nine, reverses the condition of gate 403 to input a zero to gate 402 thereby causing a binary one in conductor 405 which requires a binary zero output from the gate 401. Thus, the logical circuitry provided in the circuit means 56 counts for nine pulses in the counter 55a, counts in both counters 55a and 55b for one pulse and thereafter repeats the cycle to effect a ten carry from counter 55a.

When the level sensor 25 detects an input voltage above a predetermined level of 25 volts in the preferred embodiment, gain in amplifier 15 is reduced by tenfold. This causes the V-to-F converter 20 to provide output pulses which are ten times greater in magnitude of area integration. These pulses are connected directly to the tens counter 55b. This is accomplished because level sensor 25 provides binary one on the conductor 95 which requires a binary zero in the conductor 405. A binary zero having been previously provided in conductor 58 to initiate operation of the counter 55, pulses to be counted are supplied by the conductor 45 to the tens counter 55b. The binary one on the gate 402 isolates the counter 55b from the carry pulses supplied through the gate 403 as described previously.

This condition of inputting all pulses to the tens counter 55b is continued indefinitely as long as the binary one signal subsists on the conductor 95.

Referring again to FIG. 4 and the timing indicated in FIG. 6, the conductor 328 is connected to a timing circuit providing a properly timed signal over the conductor 93 to clamp the output of the peak sensor through the interval of time represented by the arrow 356 in FIG. 6. This circuitry provides an output signal from time T to time X' in response to binary signals in the conductor 328. Signals in the conductor 328 are binary signals opposite to the signals in the conductor 327. Therefore, the quiescent signal in conductor 328 is a binary zero from which the level switches to binary one only for the interval of time which the level sensor 25 operates the integrator 10 at reduced gain. The time delay circuitry connected to the conductor 328 functions on the positive going signal occurring when the signal in conductor 328 shifts from binary one to binary zero. The positive going change occurs at the termination of the period of reduced gain or at time X as shown in FIG. 6, whereby the delay occurs thereafter or at time X'. Since the circuitry connected to conductor 328 is identical to the circuitry connected to conductor 327, components are identified by the same reference numerals primed.

Output of the timing circuit is taken from the resistor 391' to a series resistor 420 connected to a transistor 421. The transistor 421 is biased off by connection of a base resistor 422 to the positive supply 300 and has a collector diode 423. The conductor 93 is connected to the collector through a resistor 424 and communicates with the relay 263 shown in FIG. 3 which places a small resistor 262 in the feedback loop of amplifier 28.

FIG. 5 illustrates the base line control circuit 50 and its connection to V-to-F converter 20, which is illustrated with portions of the circuit in block form. FIG. 5 illustrates the servo driven potentiometer 48 providing a feedback voltage at the wiper arm 48a which is communicated through a resistor 430 to a nodal point 433. Potentiometer 48 is driven by means controlling the amount of feedback to stabilize the base line furnished to the converter 20. Since the base line signal furnished to the converter 20 by the conductor 18a passes through the amplifier 15 and the base line is diminished by tenfold when the gain of the amplifier 15 is changed, it is necessary to have the base line signal referenced to ground potential because any offset from ground potential will not be reduced relatively by tenfold but it will result in a plateau which will be counted. Therefore, a potentiometer 432 provides an adjustable voltage through the tap 432a which is connected to the nodal point 433 to reference the V-to-F converter input to ground. The potentiometer 48 then compensates for drift only whereas errors in counting are eliminated.

The point 433 is connected to ground through resistor 434 and resistor 435 which have values selected whereby resistor 434 is nine times greater than resistor 435. A relay 436, operated by a signal on the conductor 94, switches its contacts 436a to obtain voltages for conduction by the wire 51 to the converter 20. The signal on the conductor 51 is referenced to zero potential without regard to whether or not the base line voltage is reduced by ten. It should be recalled that the servo driver 46 does not drive the servo 47 during peaks. Therefore, the means of the base line control 50 are adopted to properly compensate for base line drift as last remembered by the servo driver 46.

Input signals from the source 12, after amplification, are supplied by the conductor 18a to series resistors 440 and 441 to a nodal point 444. Nodal point 444 is communicated with ground by a pair of side-by-side diodes 445 and 446 which limit the range of fluctuations of the nodal point. Resistor 441 is shunted to ground by a capacitor 447 and a capacitor 448 is paralleled with the diodes 445 and 446. A stable DC amplifier 450 amplifies the voltage at the point 444 and a feedback loop including capacitor 452 and resistor 453 is connected to the point 444. Output of the amplifier 450 is connected to a Schmitt trigger 455 and drives a pulse shaping circuit 456 which provides the output pulses in the conductor 45. In addition, the Schmitt trigger 455 is connected to an amplifier 457 which provides a feedback loop through a diode 458 which connects to the point 444. Zero adjust of the point 444 is achieved by means of a potentiometer 459 connected to some voltage source and connected to the point 444 through a series of resistor 460.

The converter 20 accumulates charge on a capacitor to obtain a voltage at the point 444 which is amplified by the amplifier 450. The charge accumulates until the voltage causes the Schmitt trigger 455 to operate and form a pulse amplified by the amplifier 457. The pulse (a pulse of current) is supplied through the feedback loop and diode 458 to diminish the charge accumulated at the point 444. The capacitor which accumulates the charge at the point 444 is the combination of capacitor 448 and capacitor 452. It may be appreciated that capacitor 452 is connected across the DC amplifier 450 and defines a Miller integrator circuit whereby the value of the capacitor 452 is effectively increased dependent on the gain of the amplifier 450.

As a general premise, it is possible to increase a maximum operating frequency of a V-to-F converter 20 by reducing the value of the capacitor such as capacitor 452. However, this is obtained at the sacrifice of increasing the minimum pulse repetition frequency of the converter 20 so that it will be appreciated that no relative change is effected. Stable and very low frequency operation of the converter 20 of the present invention is possible because the input resistor of 18.7 K. in the conductor 18a drops the signal and greater signal is required to achieve a pulse output by the converter 20. This permits the converter 20 to output a pulse representing greater charge accumulation from the signal supplied by the conductor 18a so that each pulse output represents equal units of area under the curve of the wave form input by the conductor 18a which units of area are relatively large. This in nowise affects stability at very small input currents when the output pulses of the converter 20 are few and far between. Stability is unaffected because the Schmitt trigger 455 recognizes the accumulation of current on the equivalent capacitor connected to the point 444 at a mid point on the exponential charging curve and not at the maximum value which is approached asymptotically. The point at which a pulse is generated is on the relatively linear portion of the exponential curve representing the voltage on the effective capacitor and achieves a long time constant of accumulation of charge.

In operation, the integrator 10 of this invention can be considered from the point of view of providing an integrator device which operates accurately without regard to noise of any description and should also be considered from the point of view of providing an integrator with an essentially unlimited range.

The input amplifier 15 as illustrated in FIG. 2 of the drawings was described as a multistage amplifier which is predominated by low-frequency and high-frequency roll-off circuits so that spurious oscillations which are the bane of amplifiers are so attenuated that the amplifier 15 prevents such oscillations. The high-frequency roll-off circuit includes the capacitor 107 connected to the collector of the transistor 101 included in the amplifier 15. Transistor 101 provides a high impedance to the input signal in co-operation with the feedback provided in the amplifier 15 and amplifies the input signals whereby high-frequency content of the amplified signal is shunted to ground by the capacitor 107. The capacitor 107 so predominates at higher frequencies that the gain of the amplifier is reduced to less than one whereby spurious oscillations at higher frequencies are not amplified.

Coupling capacitor 140 provides a low-frequency roll-off circuit in the amplifier 15. The capacitor 140 attenuates signals having a frequency below the pass band of the amplifier 15 and so predominates operation of the amplifier 15 that oscillations in the low-frequency range are not supported to prevent unwanted oscillations in the amplifier 15.

It may be appreciated that noise of all frequencies is made available to the integrator 10 of this invention with the signal from the source 12. Assuming such noise is broad band, it may be appreciated that the high frequency filter means including capacitor 107 removes some noise from the signal while low-frequency filter means including capacitor 140 serves in a similar function for noise components at low-frequencies.

Amplifier 21 which functions, in part, as a preamplifier for the differentiating means 24 is provided with the demodulated and amplified signal by the conductor 18. From the point of view of operation of the peak sensor means, it may be appreciated that noise in the signal is particularly unwanted and most especially if it causes the peak sensor to indicate the presence of a peak when in fact there is only noise. Consider first the possibility of the peak sensor triggering and indicating a peak which is spike noise as might occur when a stroke of lightning strikes the power distribution system supplying power for the integrator 10 of this invention. It is difficult if not impossible to filter spike noise from power systems. Spike noise is filtered by the narrow pass band amplifier 15 if it were input to the amplifier because spike noise is high frequency and beyond the pass band of the filter of the amplifier 15. However, spike noise is also sometimes fed through various power supplies into all circuit elements of the integrator 10 such as the amplifier 21 in the peak sensor means. On the premise that spike noise is in all power supplies, the peak recognition circuit 41 might perceive a peak and provide an indication to the logic control circuitry 57 which would operate the integrator for integration of area underneath the spike, it being presumed that the spike noise in the power supplies would also affect operation of the V-to-F converter 20. Data is recorded in the data counter 55, but it will be appreciated that the minimum peak timer 82 prevents print out of data at printer 71. Thus, very large spikes passed through power supplies cannot give rise to false information and spike noise occurring in front of the amplifier 21 is filte rto avoid integration of nonexistent peaks. In either event, spike noise is of no problem and is disposed of by minimum peak width means of this invention.

While spike noise is high-frequency noise which is filtered by the integrating amplifier 21, drift in the base line is low-frequency noise. In addition to drift, there may be other sources of low-frequency noise. By definition, drift is a change in signal amplitude which is very gradual and which therefore has a very small slope, either positive or negative. The small slope of drift is not sufficient to operate the peak sensor means of this invention to indicate the presence of a peak fluctuation because the derivative or measure of the slope obtained by the differentiating means 24 is too small to trigger operation of the Schmitt triggers 34 and 35. Thus, it may be understood that the peak sensor means includes slope sensitive means in which slope of the signal is defined and tested to ascertain a bona fide peak fluctuation. Of course, a signal sufficient to cause operation of the peak sensor means must have both slope and sufficient amplitude.

The interaction of the series resistor 190 and voltage clamp including the diode 191 in the amplifier 21 as illustrated in FIG. 3 of the drawings, effects a reduction in gain by the amplifier 21 for large input signals. Conversely, small input signals are fully amplified by the amplifier 21 to achieve signal expansion of input signals at or near the base line whereby peak onset and termination are exaggerated for the peak sensor means. Since the peak sensor means indicates only presence or absence of a peak, it may be appreciated that the reduction of gain for large input signals is of no consequence and assists the peak sensor means to respond rapidly to changes in large input signals.

Noise of all frequencies has a different effect on the V-to-F converter 20. While the peak sensor means indicates only the presence or absence of peaks, the converter 20 measures the integral area of peak fluctuations. The integrator 10 includes the drift feedback from the base line control 50 which operates as means for removing drift in the signal. Moreover, other noise occurring at base line signal is not integrated by the V-to-F converter 20 because it is not operated at base line conditions but is only operated during peak fluctuations.

It may be assumed that most noise at base line conditions does not integrate to a total error of zero or, in other words, noise at base line does not create equal positive and negative errors in area because the base line value is commonly so small that it is impossible for the negative-going noise to reverse polarity of the signal. However, this is not the case at higher voltages and it may be appreciated that the V-to-F converter 20 effects integration of the signal input thereto and accomplishes noise correction of the integral whereby the output indications accumulated in the data counter accurately reflect the signal without noises. This is particularly true in view of the fact that the amplifier 15 which provides slow rise time amplification of the input signal effectively removes noise from the signal so that the integral of the noise is not an erroneous factor when recorded by the data counter 55.

The integrator 10 of this invention includes means automatically sizing the input signal to maintain same within the linear operating range of the device. Moreover, such automatic sizing is accomplished while yet maintaining equality of indications reported by the data counter 55 and stored by operation of the printer 7. As described, the level sensor 25 provides a reduction in signal by operation of gain control means, but the reduction in gain is accomplished simultaneous with operation of means 56 interposed between the converter 20 and the counter 55 to effect an inversely proportionate amplification of integral indications from the converter 20 whereby indications accumulated in the counter 55 remain equal one to the other. The level sensor 25 provides circuit timing means which compensate for the slow rise time within the circuitry of the integrator 10 when the gain is switched in the amplifier 15 whereby the accumulated area in the data counter 55 is correct.

The level sensor 25, on reduction of gain in the amplifier 15, clamps the peak sensor output by operation of the overload protection circuit 30 to avoid false triggering on input of an apparent negative-going signal on reduction of gain and a positive-going signal on increase of gain.

When the integrator 10 of this invention is connected to a source 12 and a permanent record of the signal from the source 12 is desired, the isolation amplifier 90 is utilized to supply the signal from the source 12 to any recording device wherein the recording device is isolated from the input of the integrator 10. This is particularly advantageous due to the fact that most recording devices include internal circuits which irregularly load the source 12.

Certain alterations may be incorporated in the integrator 10 of this invention. As an example, the width of a peak may be obtained by a timer and a counter of perhaps three decades to record the width in seconds. Such counter would be actuated by the signal from the peak recognition circuit 41 to time the width of peaks.

The output data may be placed on punch cards, magnetic tape, paper tape, or other mediums in which event the output of the decimal converter 64 is connected to an appropriate interface device well known in the art.

The modulator 13 and demodulator 17 of this invention may be altered to operate at any frequency found desirable, although it is wise to avoid multiples of 50 and 60 cycles per second. The modulator 13 may be electronic or mechanical. If desired, the level sensor 25 may be switched in synchronism with the modulator 13 and demodulator 17 by obtaining a synchronous signal and inserting same into the level sensor 25 at some appropriate point.

The multirange integrator of this invention is shown and described as preferably having two ranges which differ by a factor of 10. It may be appreciated that a third range providing an additional multiple of 10 may be added to further increase the range of the device without practical limit. If desired, the device may be altered to provide a ratio other than 10 between the multiple ranges. This alteration is within the purview of those skilled in the art.

Regardless of the ratio chosen between multiple ranges of operation of the integrator device of this invention, it may be appreciated that the ratio of gain in the amplification stages preceding the integrator means inversely is matched by means interposed between the V-to-F converter 20 and the counter 55 to achieve proportionality whereby units of area under wave form peaks remain equal one to the other without regard to the changes in gain preceding the V-to-F converter 20. Moreover, the area which is represented by one unit may be scaled quite high to provide a very sensitive device responding to very small changes in signal-time area.

As an alternative configuration for obtaining the integral of area under wave form peaks, one such means within the scope of this disclosure might include a capacitor for accumulating charge to represent the integral of the area under a peak. Such capacitor would start with zero charge at peak onset and would accumulate charge to a peak termination whereupon a reading of the charge could be taken by means of a high impedance amplifier circuit connected to a meter calibrated in appropriate units. Transistor technology has provided transistors having an input impedance on the order of $10^{15}$ ohms which is more than sufficient to sense the charge collected on the capacitor without providing a leakage path to the detriment of accuracy of such arrangement. It may be appreciated that other types of storage devices are known to those skilled in the art and may be used in lieu of the integrator means and counter means shown in the preferred embodiment. As will be appreciated, alterations such as those suggested above may result in combining the functions of the integrating means and counter means described in the preferred embodiment and as included in the claims attached hereto.

Broadly, this invention relates to an integrating device having sufficient range so as to provide unlimited range of operation in the context of analytical devices known in the art and which device is substantially immune to noise.

What is claimed is:

1. An integrating unit for use with signal sources providing an input signal having analytical peak fluctuations extending from a base line value of a few microvolts or less, comprising:
- (a) an input signal amplifier responsive to the input signal, said amplifier amplifying the input signal by a predetermined amount of gain;
- (b) peak sensor means for determining the presence or absence of bona fide analytical peak fluctuations from the base line of the output signal, said peak sensor means further including means for providing an output signal indicating the presence or absence of fluctuations of the input signal;
- (c) incremental integrating means responsive to said input signal for providing an output indication linearly representing integrals of input signal amplitude;
- (d) level sensor means responsive to the input signal for comparing the amplitude of the input signal to a predetermined reference signal level and producing a control signal whenever the input amplitude exceeds such level;
- (e) means responsive to the level sensor control signal for reducing the gain of said amplifier when the input signal exceeds the predetermined reference level;
- (f) counter means connected to said integrating means for accumulating indications from said integrating means;
- (g) means interposed between said integrating means and said counter means for receiving output indications of said integrating means and responsive to the level sensor control signal for supplying such indications to a higher order stage of said counter means when the gain of said amplifier is reduced; and
- (h) control means responsive to the output signal of said peak sensor means for controlling said counter means for providing separate counter output signals denoting the indications accumulated during the occurrence of the different ones of the bona fide fluctuations in the input signal.

2. An integrating unit for use with signal sources providing an input signal having analytical peak fluctuations extending from a base line value of a few microvolts or less, comprising:
- (a) an input amplifier responsive to the input signal, said amplifier being of multistage construction for amplifying the input signal;
- (b) peak sensor means for determining the presence or absence of bona fide analytical peak fluctuations from the base line of the amplified input signal, said peak sensor means further including means for providing an output signal indicating the presence or absence of fluctuations of the input signal;
- (c) incremental integrating means responsive to the amplified signal for providing output indications representing integrals of input signal amplitude;
- (d) level sensor means connected to the output of said amplifier for comparing the amplitude of the amplified input signal to a predetermined reference signal level and producing control signals having a first value when the amplified signal amplitude is below such level and a second value when such amplitude exceeds such level;
- (e) gain control means responsive to said level sensor control signals for reducing the gain of said amplifier when the amplified input signal exceeds said predetermined reference level;
- (f) said gain control means including means for maintaining said amplifier in said reduced gain condition until the amplified input signal falls below a second and lower predetermined reference signal level;
- (g) said first predetermined reference signal level being related to the linear range of operation of said integrating means;
- (h) counter means connected to said integrating means for accumulating output indications from said integrating means;
- (i) control means responsive to the output signal of said peak sensor means for controlling said counter means for providing separate counter output signals denoting the indications accumulated during the occurrence of the different ones of the bona fide fluctuations in the input signal; and
- (j) means interposed between said integrating means and said counter means for receiving the output indications of said integrating means and responsive to the level sensor control signals for supplying such indications to a higher order stage of said counter means when the gain of said amplifier is reduced.

3. An integrating unit for use with signal sources providing an input signal having analytical peak fluctuations extending from a base line value of a few microvolts or less, comprising:
- (a) an input amplifier responsive to the input signal, said amplifier being of multistage construction for amplifying the input signal;
- (b) peak sensor means for determining the presence or absence of bona fide analytical peak fluctuations from the base line of the amplified input signal, said peak sensor means further including means for providing an output signal indicating the presence or absence of fluctuations of the input signal;
- (c) incremental integrating means responsive to the amplified input signal for providing output indications representing integrals of input signal amplitude;
- (d) level sensor means responsive to the input signal for comparing the amplitude of the input signal to a predetermined reference signal level and producing a control signal when the input amplitude exceeds such level;
- (e) gain control means responsive to said level sensor control signal for reducing the gain of said amplifier input when the signal exceeds the predetermined reference signal level;
- (f) clamping means co-operating with said peak sensor means and responsive to said level sensor control signal for continuing the output indication of said peak sensor means when the gain of said amplifier is reduced;
- (g) counter means connected to said integrating means for accumulating indications from said integrating means;
- (h) control means responsive to the output signal of said peak sensor means for controlling said counter means for providing separate counter output signals denoting the indications accumulated during the occurrence of the different ones of the bona fide fluctuations in the input signal; and
- (i) means interposed between said integrating means and said counter means for receiving output indications of said integrating means and responsive to the level sensor control signal for supplying such indications to a higher order stage of said counter means when the gain of said amplifier is reduced.

4. An integrating unit for use with signal sources providing an input signal having analytical peak fluctuations extending from a base line value of a few microvolts or less, comprising:
- (a) an input amplifier responsive to the input signal, said amplifier being of multistage construction for amplifying the input signal;
- (b) said amplifier having a relatively narrow pass band for amplifying peak fluctuations in the input signal and having a relatively slow response for filtering noise out of the amplified input signal;
- (c) peak sensor means for determining the presence or absence of bona fide analytical peak fluctuations from the base line of the amplified input signal, said peak sensor means further including means for providing an output signal indicating the presence or absence of fluctuations of the input signal;
- (d) incremental integrating means responsive to the amplified input signal for providing output indications representing integrals of input signal amplitude;

(e) level sensor means responsive to the input signal for comparing the amplitude of the input signal to a predetermined reference signal level and producing a control signal when the input amplitude exceeds such level;

(f) gain control means responsive to said level sensor control signal for reducing the gain of said amplifier when the amplified input signal exceeds the predetermined reference signal level;

(g) counter means connected to said integrating means for accumulating indications from said integrating means;

(h) control means responsive to the output signal of said peak sensor means for controlling said counter means for providing separate counter output signals denoting the indications accumulated during the occurrence of the different ones of the bona fide fluctuations in the input signal;

(i) interposed means between said integrating means and said counter means for receiving output indications of said integrating means and for supplying such indications to a higher order stage of said counter means when the gain of said amplifier is reduced; and (j) timing means responsive to the level sensor control signal for controlling operation of said interposed means to compensate for error in pulse accumulation in said counter means arising from the relatively slow response of said amplifier.

5. Wide range integrator apparatus for use with analytical measuring instruments which produce measurement signals having recurrent data fluctuations which extend from a baseline value comprising:

a signal amplifier for amplifying the measurement signal obtained from the analytical measuring instrument;

a voltage-to-frequency converter responsive to the amplified measurement signal for producing an output pulse for each predetermined incremental area of the measurement signal waveform above the baseline value;

a plural stage pulse counter for counting the pulses produced during each data fluctuation in the measurement signal;

peak sensor circuit means for detecting the occurrences of individual data fluctuations in the measurement signal and producing output signals denoting such occurrences;

circuit means responsive to the peak sensor output signals for controlling the pulse counter for providing separate indications of the integral values for the different data fluctuations;

level sensor circuit means responsive to the measurement signal for producing a control signal whenever the measurement signal amplitude exceeds a predetermined reference level;

circuit means responsive to the level sensor control signal for reducing the gain of the signal amplifier when the measurement signal exceeds the predetermined reference level;

and circuit means responsive to the level sensor control signal for supplying the voltage-to-frequency converter output pulses to a higher order stage of the pulse counter when the gain of the signal amplifier is reduced.

6. Wide range integrator apparatus in accordance with claim 5 wherein the signal amplifier is a narrow band amplifier having a pass band of predetermined width sufficient to amplify the frequencies of the measurement signal representing bona fide fluctuations of such measurement signal.

7. Wide range integrator apparatus in accordance with claim 5 wherein the signal amplifier includes filter circuit means for filtering out high frequency noise that may be mixed with the measurement signal.

8. Wide range integrator apparatus in accordance with claim 5 wherein the signal amplifier includes high-frequency roll-off circuit means for preventing amplification of high frequency spurious oscillations and low-frequency roll-off circuit means for preventing amplification of low frequency spurious oscillations.

9. Wide range integrator apparatus in accordance with claim 5 wherein the signal amplifier is constructed to provide a high input impedance at the input terminals thereof.

10. Wide range integrator apparatus in accordance with claim 5 wherein the peak sensor circuit means is coupled to the output of the signal amplifier and is responsive to the amplified measurement signal.

11. Wide range integrator apparatus in accordance with claim 5 wherein the peak sensor circuit means include nonlinear preamplifier circuit means for providing a greater amplification for measurement signal values near the baseline value whereby the onset and termination of data fluctuations are emphasized.

12. Wide range integrator apparatus in accordance with claim 5 wherein the peak sensor circuit means includes low frequency filter circuit means for filtering the measurement signal supplied to the input of the peak sensor circuit means.

13. Wide range integrator apparatus in accordance with claim 5 wherein the peak sensor circuit means includes slope sensitive circuit means for responding to the rate of change of the measurement signal and determining therefrom the occurrence of bona fide data fluctuations in the measurement signal.

14. Wide range integrator apapratus in accordance with claim 5 wherein the peak sensor circuit means includes amplitude sensitive circuit means for establishing a predetermined threshold level for the peak sensor circuit means for minimizing the possibility of the peak sensor circuit means responding to other than bona fide data fluctuations in the measurement signal.

15. Wide range integrator apparatus in accordance with claim 5 wherein the peak sensor circuit means includes noise filter circuit means for minimizing the effect of noise on the operation of the peak sensor circuit means.

16. Wide range integrator apparatus in accordance with claim 5 wherein the pulse counter is a decade counter having a plurality of decades coupled in cascade with one another and wherein the circuit means for reducing the gain of the signal amplifier reduces such gain by a factor of ten and the circuit means for supplying the converter output pulses to the pulse counter supplies such pulses to the next higher order decade of such counter when the gain of the signal amplifier is reduced.

17. Wide range integrator apparatus in accordance with claim 5 wherein the circuit means for supplying the converter output pulses to the higher order stage of the pulse counter includes time delay means for delaying the changeover to the higher order stage until a short time interval after the gain of the signal amplifier is reduced thereby to minimize counting errors during the change-over process.

18. Wide range integrator apparatus in accordance with claim 5 which further includes circuit means connected to the voltage-to-frequency converter for minimizing the effect of drift in the baseline value of the measurement signal.

19. Wide range integrator apparatus in accordance with claim 5 which further includes a baseline control circuit for automatically minimizing drift in the baseline value of the measurement signal and circuit means responsive to the peak sensor output signals for disabling the operation of the baseline control circuit during the occurrences of the data fluctuations.

20. Wide range integrator apparatus in accordance with claim 5 which further includes an isolation circuit connected to the signal amplifier and having output terminal means for connection to a signal recorder.

21. Wide range integrator apparatus in accordance with claim 5 which further includes circuit means for establishing a minimum width for fluctuations in the measurement signal and for preventing the pulse counter from providing output indications for fluctuations having less than this minimum width.

References Cited
UNITED STATES PATENTS

| | | | |
|---|---|---|---|
| 3,185,820 | 5/1965 | Williams et al. | 235—183 X |
| 3,230,358 | 1/1966 | Davis et al. | 235—183 |
| 3,333,090 | 7/1967 | Neer | 235—151.35 |
| 3,337,722 | 8/1967 | Siess et al. | 235—92 |
| 3,359,410 | 12/1967 | Frisby et al. | 235—183 |

MALCOLM A. MORRISON, Primary Examiner

F. D. GRUBER, Assistant Examiner

U.S. Cl. X.R.

73—23.1; 235—92, 151.35